(12) United States Patent
Aspen

(10) Patent No.: US 9,237,313 B2
(45) Date of Patent: Jan. 12, 2016

(54) TRANSVERSE VERTICAL PROFILE DISPLAY FOR AERONAUTICAL ROUTES

(75) Inventor: Sven David Aspen, Sherwood, OR (US)

(73) Assignee: THE BOEING COMPANY, Chicago, IL (US)

( * ) Notice: Subject to any disclaimer, the term of this patent is extended or adjusted under 35 U.S.C. 154(b) by 1771 days.

(21) Appl. No.: 12/062,949

(22) Filed: Apr. 4, 2008

(65) Prior Publication Data

US 2009/0251540 A1 Oct. 8, 2009

(51) Int. Cl.
*H04N 7/18* (2006.01)

(52) U.S. Cl.
CPC ..................................... *H04N 7/18* (2013.01)

(58) Field of Classification Search
CPC .......... H04N 7/181; H04N 7/183; H04N 7/18
USPC .................................................. 348/144, 143
See application file for complete search history.

(56) References Cited

U.S. PATENT DOCUMENTS

| 5,828,332 A * | 10/1998 | Frederick ..................... 342/26 B |
| 6,690,299 B1* | 2/2004 | Suiter ............................ 340/973 |
| 7,477,164 B1* | 1/2009 | Barber ........................... 340/945 |
| 2005/0200502 A1* | 9/2005 | Reusser et al. ................ 340/973 |
| 2005/0264529 A1* | 12/2005 | Morgan et al. ................. 345/160 |
| 2006/0004496 A1* | 1/2006 | Tucker et al. ..................... 701/4 |
| 2006/0250280 A1* | 11/2006 | Chen et al. ..................... 340/974 |

* cited by examiner

*Primary Examiner* — June Sison
*Assistant Examiner* — Steven Nguyen
(74) *Attorney, Agent, or Firm* — Yee & Associates, P.C.

(57) ABSTRACT

A computer implemented method, apparatus, and computer usable program code for presenting terrain along a route on an aircraft display. A display is presented of a top view, a side view, and a transverse vertical profile view of terrain data along the route on the aircraft display. A plurality of graphical indicators of distance along the route is overlaid such that a graphical indicator in the plurality of graphical indicators in the top view corresponds to a same distance to a second graphical indicator in the side view and a third graphical indicator in the transverse vertical profile view.

22 Claims, 6 Drawing Sheets

FIG. 6

TRANSVERSE VERTICAL PROFILE DISPLAY FOR AERONAUTICAL ROUTES

BACKGROUND INFORMATION

1. Field

The present disclosure relates generally to an improved data processing system for use in displaying information in a vehicle and in particular to a method and apparatus for displaying information related to an aircraft. Still more particularly, the present disclosure relates to a computer implemented method, apparatus, and computer program code for displaying terrain information for an aircraft.

2. Background

Controlled flight into terrain is an event where an airworthy aircraft under the control of the pilot inadvertently flies into terrain, an obstacle, or water. In these types of accidents, the pilots are generally unaware of the danger until it is too late to avoid the terrain. Pilots with any level of experience, even highly experienced professionals, may be involved in these types of events in which a controlled flight into terrain occurs.

Factors that may cause these types of events include, for example, pilot fatigue. Further, many accidents often involve impact with significantly raised terrain such as hills or mountains. Other times, cloudy, foggy, or other reduced visibility conditions may cause this type of accident.

A controlled flight into terrain also may occur due to equipment malfunction. For example, if a malfunction occurs in navigation equipment, the navigation equipment may mislead the crew into guiding the aircraft into the terrain, despite other information received from properly functioning equipment.

After studies of these types of accidents, terrain warning and display systems have been implemented in aircraft to enhance flight safety. By providing displays of terrain, improved situational awareness, and reduced pilot workload occurs, allowing the pilot and other flight crew to focus on flying the aircraft. The information about the terrain includes elevation information about the terrain. The information is referred to as terrain elevation information.

Typical systems employed in aircraft graphically display terrain on panel displays that depict elevations surrounding the aircraft position. In other words, the currently available displays show the terrain surrounding the aircraft. These types of displays are typically referred to as side views or longitudinal route profile view displays. With these types of systems, pilots and flight crew have improved situational awareness of the terrain around the aircraft. These types of displays, however, do not always provide as much information as may be desired. Thus, the different advantageous embodiments provide a method and apparatus to overcome the above described problems.

SUMMARY

The advantageous embodiments provide a computer implemented method, apparatus, and computer usable program code for presenting terrain along a route on an aircraft display. A display is presented of a top view, a side view, and a transverse vertical profile view of terrain data along the route on the aircraft display. A plurality of graphical indicators of distance along the route is overlaid such that a graphical indicator in the plurality of graphical indicators in the top view corresponds to a same distance to a second graphical indicator in the side view and a third graphical indicator in the transverse vertical profile view.

In another advantageous embodiment, a computer implemented method presents terrain data. A display is presented of a transverse vertical profile view of terrain along a portion of a route. A two dimensional view of the terrain is presented along the route. A set of graphical indicators is displayed correlating locations between the two dimensional view and the transverse vertical profile view.

In yet another advantageous embodiment, an apparatus comprises a location information unit, a processor unit, and a display. The location information unit is capable of providing location information of a vehicle. The processor connected to the location information unit, wherein the processor unit identifies a location of the vehicle from the location information and generates an overlay of a plurality of indicators for a top view, a side view, and a transverse vertical profile view of terrain along a route, such that an indicator in the plurality of indicators in the top view corresponds to a same distance to an indicator in the side view and in the transverse vertical profile view. The display is connected to the processor unit, wherein the display presents a display of the top view, the side view, and the transverse vertical profile view of the terrain data along the route with the overlay.

In still yet another advantageous embodiment, a computer program product contains a program code for presenting terrain along a route on an aircraft display. The program code simultaneously presents a display of a top view, a side view, and a transverse vertical profile view of terrain along the route on the aircraft display. The program code overlays a plurality of indicators of distance along the route such that an indicator in the plurality of indicators in the top view corresponds to a same distance to an indicator in the side view and the transverse vertical profile view.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is another diagram of a terrain display in accordance with an advantageous embodiment;

DETAILED DESCRIPTION

Figure 1:
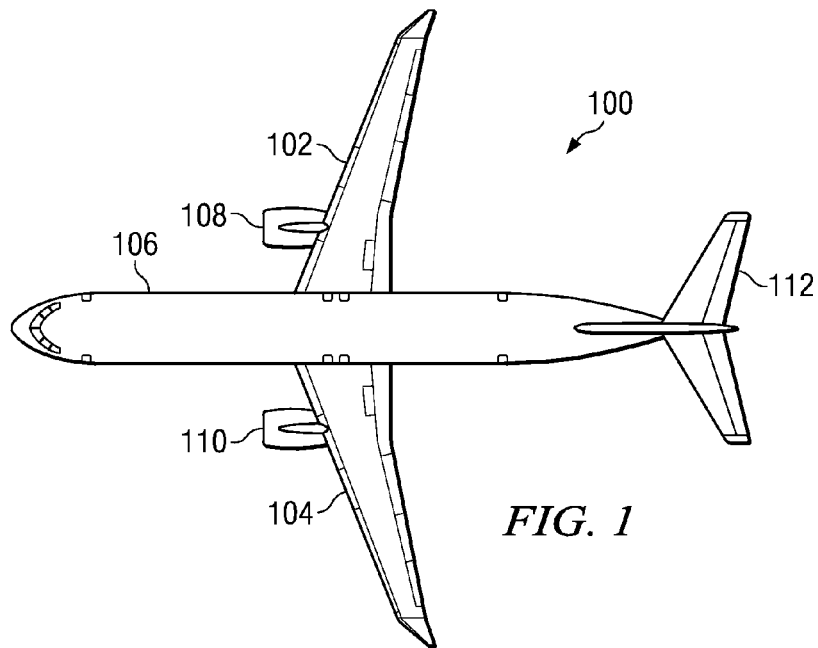
FIG. 1 is a diagram of an aircraft in which an advantageous embodiment may be implemented.

With reference now to the figures, and in particular with reference to FIG. 1, a diagram of an aircraft is depicted in which an advantageous embodiment may be implemented. Aircraft 100 is an example of an aircraft in which a method and apparatus for displaying terrain information may be implemented. In this illustrative example, aircraft 100 has wings 102 and 104 attached to body 106. Aircraft 100 includes wing mounted engine 108, wing mounted engine 110, and tail 112.

The different advantageous embodiments recognize that currently, a side view of terrain is shown in which data for the terrain is for terrain under the route. This side view is a two dimensional display that provides an identification of the height of terrain relative to the route on which the aircraft is traveling or plans to travel. The different advantageous embodiments recognize, however, this display does not provide information about the height of terrain on either side of the aircraft.

The different advantageous embodiments recognize that the information terrain on either side of an aircraft may be especially useful in required navigation performance procedures that may require a more curved or difficult path. The different advantageous embodiments, however, recognize that additional information would provide for increased situational awareness in flying an aircraft.

Thus, the different advantageous embodiments recognize that providing additional information to pilots flying aircraft would be desirable to increase the safety already provided by currently available navigation and display systems. Thus, the advantageous embodiments provide a computer implemented method, apparatus, and computer usable program code for increasing the information about terrain displayed to a user.

The different advantageous embodiments simultaneously present a display of a transverse vertical profile view of terrain along a portion of a route. Further, a two dimensional view of the terrain also is presented. This two dimensional view may be, for example, the currently available top view of the route and/or a side view of the route. Graphical indicators are also displayed that correlate locations between the two dimensional view and the transverse vertical profile view. These graphical indicators may be for specific distances.

The transverse vertical profile view of the terrain is a "front view" that shows a vertical profile slice. The top view is a view looking down from the aircraft. This view may also be referred to as a bird's eye chart view. The side view is also referred to as a longitudinal route profile view shown from the side of the aircraft. The different advantageous embodiments recognize that although some side profile views do allow a "corridor width" factor to take into consideration off route obstructions. The different advantageous embodiments recognize that these types of side views, however, are difficult to portray in an intuitive manner.

The transverse vertical profile view, along with the graphical indicators correlating the position of different features in the terrain with other views, provides information needed to increased situational awareness in the different advantageous embodiments. This view also increases the ease and intuitiveness in identifying different features in the terrain that an aircraft is traveling towards.

Figure 2:
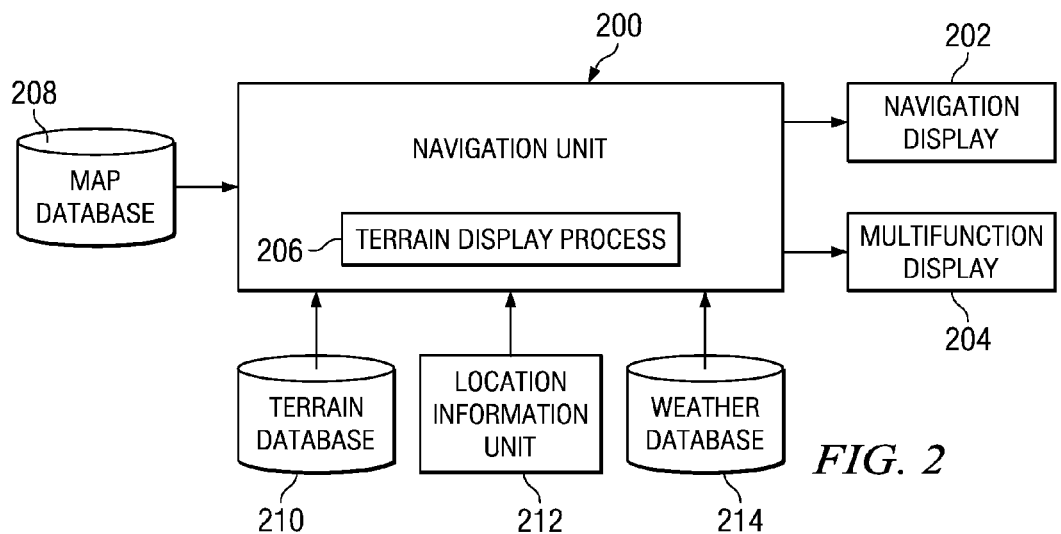
FIG. 2 is a diagram illustrating components used to provide a display of terrain in accordance with an advantageous embodiment.

Turning now to FIG. 2, a diagram illustrating components used to provide a display of terrain is depicted in accordance with an advantageous embodiment. The different components illustrated in FIG. 2 may be implemented in an aircraft, such as aircraft 100 in FIG. 1.

In this example, navigation unit 200 provides a presentation of maps, terrain displays, and other navigation information through navigation display 202 and multifunction display 204. In these examples, navigation display 202 may display information, such as altitude, air speed, vertical speed, and other measurements pertaining to the flight. Multifunction display 204 may present information to a pilot in numerous configurable ways. For example, multifunction display 204 may provide a display of terrain in accordance with an advantageous embodiment. In particular, multifunction display 204 may present a two dimensional terrain elevation view generated according to the advantageous embodiments.

In the illustrative examples, terrain display process 206 provides a view in which a two dimensional view of terrain along the route is presented along with another display of a transverse vertical profile view of the terrain along the portion of the route. The two dimensional display includes at least one of a top view and a side view. In other words, at least one of the top view and the side view means that the display may include a top view, a side view, or a top view and a side view.

Terrain display process 206 may obtain maps of the areas over which the aircraft flies from map database 208. An identification of terrain for those particular areas may be found in terrain database 210.

Map database 208 may be a local database within the aircraft on which navigation unit 200 is located. Alternatively, map database 208 may be a remote database accessed by navigation unit 200 through a communications link, such as a wireless communications link. In a similar fashion, terrain database 210 may be found locally within the aircraft or may be a remote database accessed by navigation unit 200.

In the different illustrative examples, the transverse vertical profile view along with the other two dimensional views may be displayed by terrain display process 206 in navigation unit 200. In these examples, this information may be displayed in multifunction display 204. In these examples, graphical indicators are overlaid or displayed to correlate locations between the two dimensional view and the transverse vertical profile view. A set, as used herein, refers to one or more items. For example, a set of graphical indicators is one or more indicators. These indicators are graphical indicators in these examples.

Further, these indicators may be associated with the different distances or locations. In these examples, the graphical indicators may be color coded such that a feature displayed in the side view is corresponding to the same feature in the top view and the transverse vertical profile view through the use of the same color. As a result, these three views are similar to those used in engineering drawings that present features of a three-dimensional object using two-dimensional drawings. With this type of analogy, the transverse vertical profile is similar to a cross section or slice from the top view and/or side view.

In other advantageous embodiments, other graphical indicators may be used. These other graphical indicators include, for example, using a symbol or graphical indicator to correlate the positions. The examples are alternatives to the color coded cross section lines.

The location of the aircraft relative to the map may be identified using location information unit 212. Location information unit 212 may take different forms depending on the particular implementation. For example, location information unit 212 may be a global positioning system that provides global positioning system data to terrain display process 206 within navigation unit 200. Alternatively, location information unit 212 may be an inertial guidance system on the aircraft. Of course, other types of location information units may be implemented depending on the particular embodiment.

Weather database 214 is used to provide weather information that may be included by terrain display process 206 when displaying a terrain elevation view on multifunction display 204. Weather database 214 may be one or more databases or services that provide weather information. The weather information may include both current weather information as well as weather forecasts. This information may describe weather conditions, such as cloud base or coverage, and wind speed and direction.

Although terrain display process 206 is implemented in a navigation unit with different displays, the different processes used in the advantageous embodiments may be implemented in other components. In other embodiments, these processes may be implemented in a computer or other data processing system in a flight bag, which is a portable system that may be carried by a pilot or other flight crew from aircraft to aircraft.

Figure 3:
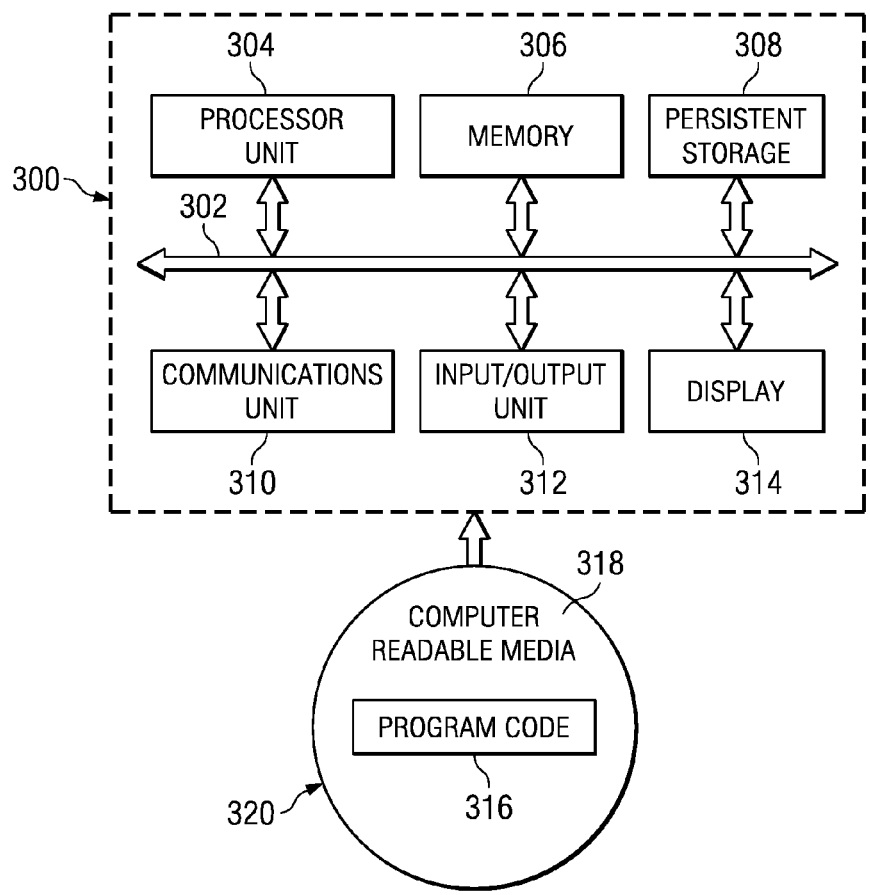
FIG. 3 is a diagram of a data processing system in accordance with an illustrative embodiment.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples.

In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
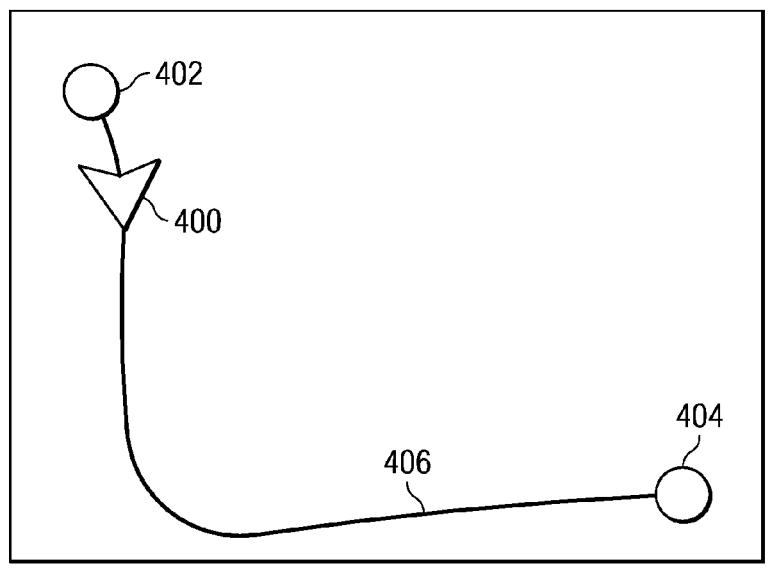
FIG. 4 is a diagram illustrating a route of an aircraft in accordance with an advantageous embodiment.

With reference next to FIG. 4, a diagram illustrating a route of an aircraft is depicted in accordance with an advantageous embodiment. In this example, aircraft 400 may take off from origination point 402 and fly to destination point 404 along route 406. Route 406 is a planned route in these examples. Origination point 402 may be a point of departure from an airport. Alternatively, origination point 402 may be some other point selected by the pilot or aircraft crew during flight. In a similar fashion, destination point 404 may be a point of arrival at another airport or some other point along the route selected by a pilot or aircraft crew.

In this example, route 406 is not a straight line between origination point 402 and destination point 404. The display of terrain provided in these examples may be for terrain along route 406. An example of a display that may be presented through multifunction display 204 in FIG. 2 is illustrated in FIG. 5.

Figure 5:
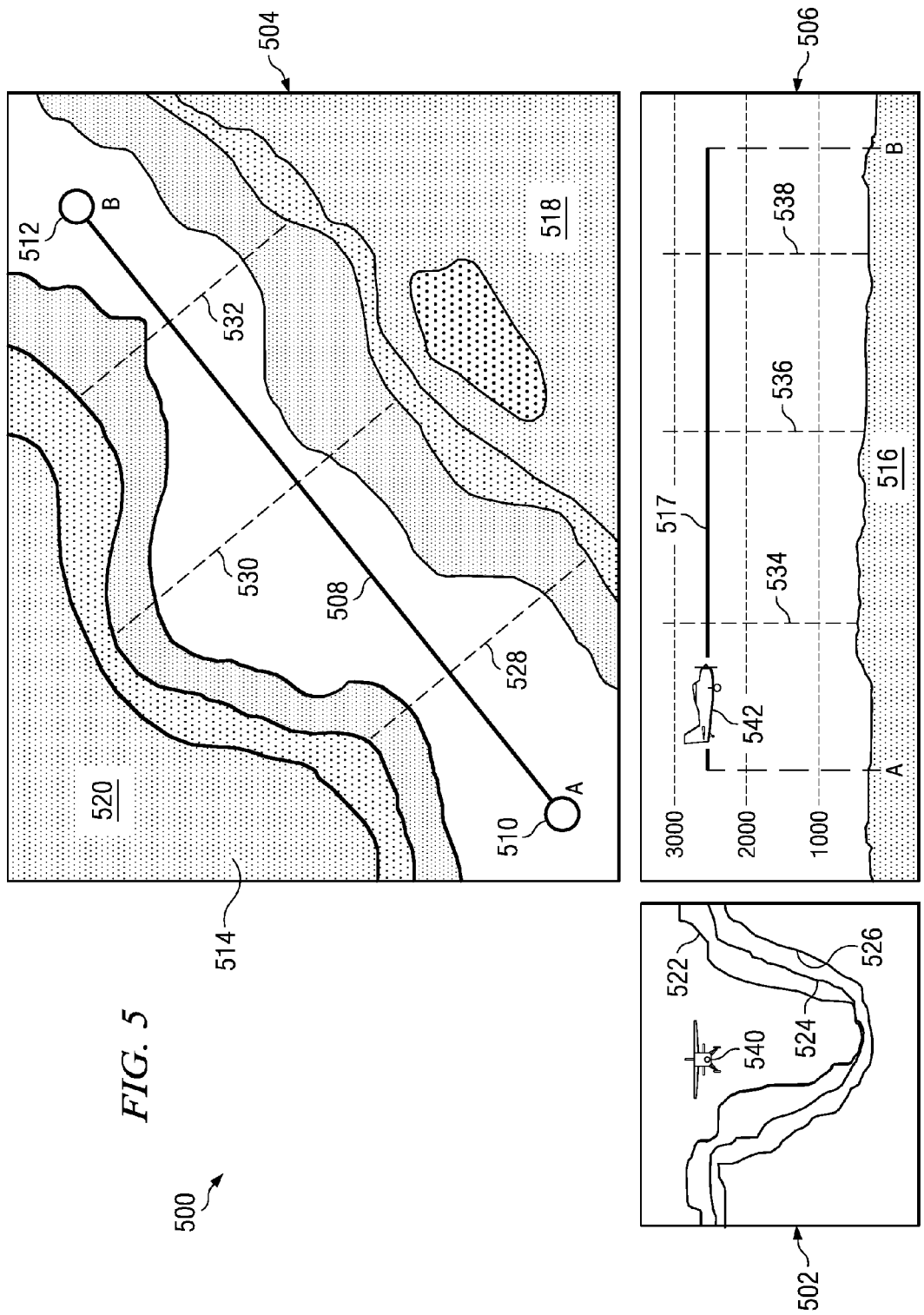
FIG. 5 is a diagram of a terrain display in accordance with an advantageous embodiment.

With reference now to FIG. 5, a diagram of a terrain display is depicted in accordance with an advantageous embodiment. In this example, display 500 is an example of a display presented in multifunction display 204 in FIG. 2. In particular, this display may be generated using terrain display process 206 in FIG. 2. As depicted, display 500 includes a number of different views. These views include transverse vertical profile view 502, top view 504, and side view 506. These three views are similar to the presentation of objects using engineering drawings. Transverse vertical profile view 502 is a "section" or "slice" of the routing region. In these examples, top view 504 and side view 506 each individually or in combination may form a two dimensional view of the route along which an aircraft flies.

In this example, segment 508 is a portion of a route between point 510 and point 512. Segment 508 may be a portion of a route, such as route 406 in FIG. 4. In other advantageous embodiments, segment 508 represents all of route 406 in FIG. 4.

In this example, terrain 514 is displayed within top view 504. Top view 504 provides a contour map over which segment 508 is overlaid or displayed to allow an operator to see terrain 514 around the route of the aircraft.

Side view 506 provides a view of terrain 514 in section 516. In these examples, section 516 may illustrate terrain 514 directly below segment 517. Segment 517 corresponds to segment 508 in top view 504. Additionally, section 516 may be displayed in a manner to show terrain close by on one side or the other side of segment 517. For example, section 516 may be a display of the highest level of terrain that may be on either side of segment 518, such as the terrain in sections 518 and 520 in top view 504.

Although this type of display is useful, the different advantageous embodiments recognize that top view 504 and side view 506 may not always provide an intuitive identification of terrain information for an operator. As a result, transverse vertical profile view 502 provides a front view or cross-section of the terrain that the aircraft is flying towards. In these examples, transverse vertical profile view 502 displays terrain 514 using lines 522, 524, and 526. These contour lines identify the terrain along different portions of segment 508. These contour lines are also displayed with graphical indicators to correlate the terrain being displayed with the other views.

In these examples, graphical indicators in the form of lines 528, 530, and 532 are displayed in top view 504. A set of graphical indicators in the form of lines 534, 536, and 538 are displayed in side view 506. Further, these graphical indicators are presented in a manner that allows for a correlation of terrain data between the different views. For example, the location of lines 528, 530, 532, 534, 536, and 538 and their position with respect to the displayed terrain may allow an operator to correlate top view 504 with side view 506.

In addition, other information may be presented in the different views. For example, transverse vertical profile view 502 also may include images or graphical icons to represent vertical obstructions. These vertical obstructions may include, for example, mountains, radio towers, and other obstructions. By presenting these types of obstructions, a clearer cross-track clearance relative to the aircraft may be identified. Also, other information, such as, special use or terminal airplane space identifications may be overlaid or presented within transverse vertical profile view 502.

Further, these graphical indicators may be color coded in a manner that allows for correlation of terrain information in top view 504 and side view 506 with transverse vertical profile view 502. For example, line 522, line 528, and line 534 may be displayed using the same color. A different color may be chosen to display line 524, line 530, and line 536. Yet another color may be used to display line 526, line 532, and line 538. In this manner an operator of an aircraft may be able to identify what terrain may be encountered by an aircraft. Further, symbol 540 in transverse vertical profile view 502 and symbol 542 in side view 506 may be used to identify the location of an aircraft with respect to segment 508. Segment 517 in side view 506 provides a similar view of a route.

In this example, a symbol representing the aircraft may or may not be displayed in all of the views. For example, a symbol is not shown in top view 504, but may be included in other advantageous embodiments. The example of the manner in which terrain is displayed in display 500 is not meant imply limitations as to how a transverse vertical profile view may be presented along with a two dimensional view of terrain. For example, other arrangements of transverse vertical profile view 502, top view 504, and side view 506 may be presented. For example, transverse vertical profile view 502 may be presented in a different size or in a different location than display 500.

Further, other types of graphical indicators other than lines and color coding may be used. For example, different types of lines, such as dotted lines, dash lines, dots and dashes in lines, and other suitable types of lines may be used to present the set of graphical indicators to correlate the terrain information. Also, instead of color coding, graphical symbols may be displayed in association with the lines or in place of the lines depending on the particular implementation.

Figure 6:
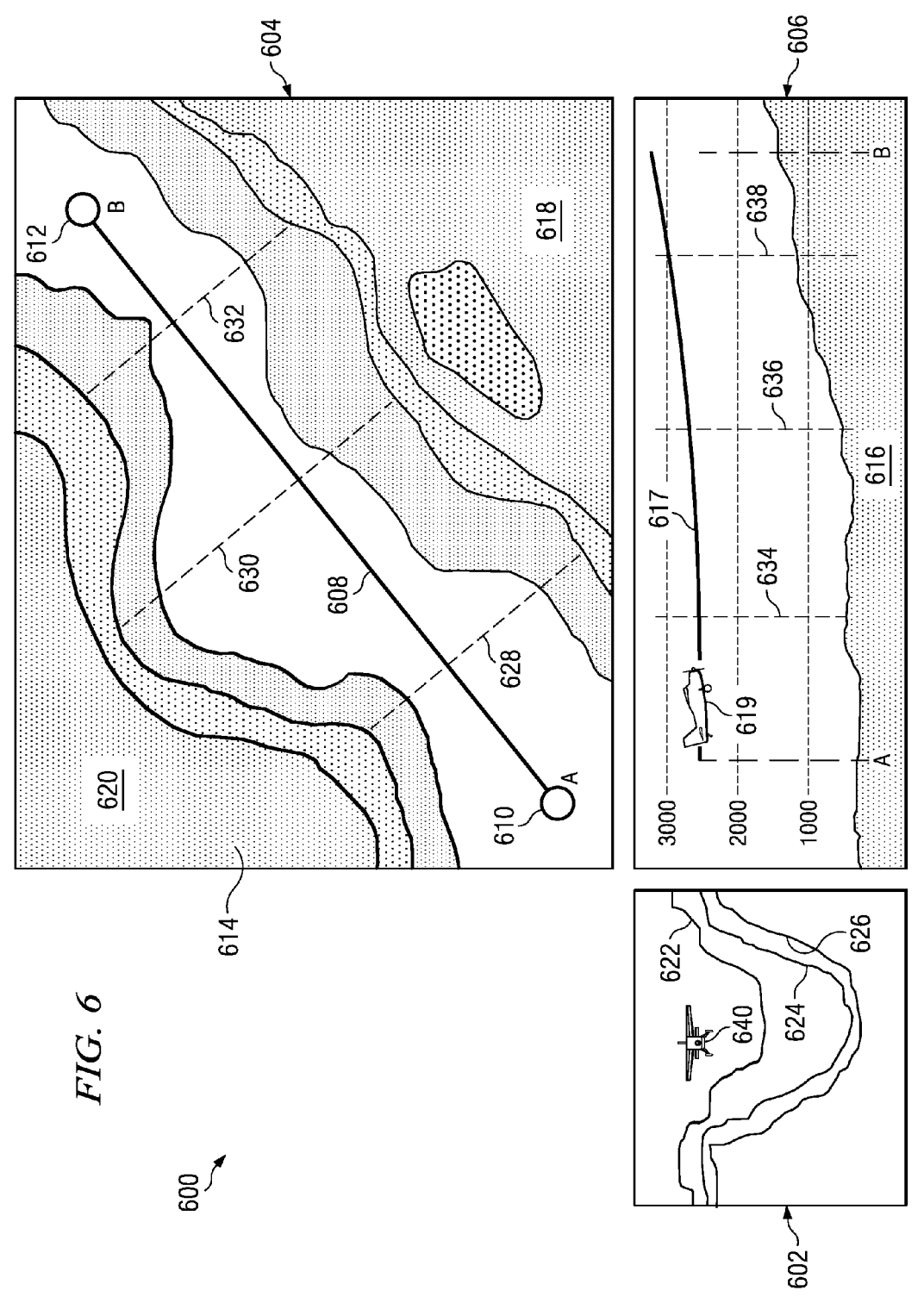

With reference now to FIG. 6, a diagram of a terrain display is depicted in accordance with an advantageous embodiment. In this example, terrain display 600 is similar to terrain display 500 in which transverse vertical profile view 602, top view 604, and side view 606 are present.

In a similar fashion, segment 608 illustrates a portion of a route between point 610 and 612. In this example, terrain 614 is displayed within top view 604 with segment 608 being overlaid or displayed to provide an operator of the aircraft to identify terrain 614 around the route of the aircraft.

Side view 606 provides a view of terrain 614 in section 616. As can be seen in this example, section 616 rises to illustrate a slight climb for the aircraft as illustrated by symbol 619.

In these examples, lines 628, 630, and 632 form graphical indicators for a top view 604. Lines 634, 636, and 638 form graphical indicators for side view 606. Line 626, 624, and 622 form graphical indicators for transverse view 602. Line 626 corresponds to lines 634 and 628. Line 624 corresponds to lines 636 and 630, and line 622 corresponds to lines 638 and line 632 in these examples. Additionally, symbol 640 may be displayed to show the relative position of the aircraft with respect to oncoming terrain illustrated in transverse vertical profile view 602.

In these examples FIG. 5 and FIG. 6 represent active views that are presented based on the current status of the aircraft's rate of steady flight or climb. Similar views may be present for an aircraft that is descending.

Figure 7:
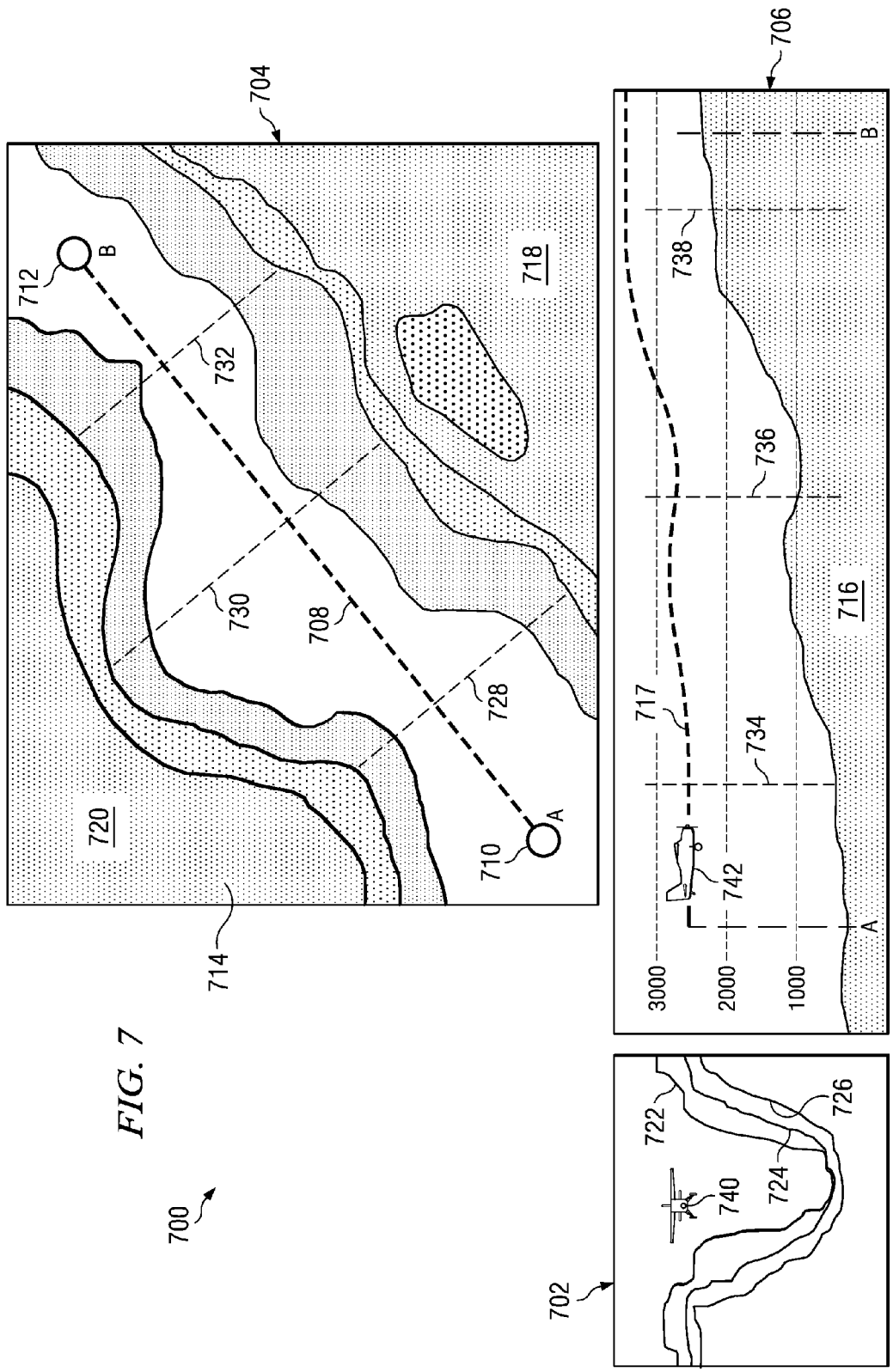
FIG. 7 is yet another diagram of a terrain display in accordance with an advantageous embodiment.

With reference now to FIG. 7, a diagram of a terrain display is depicted in accordance with an advantageous embodiment. In this example, terrain display 700 may be an example of a display for a route corresponding to a flight plan loaded in a navigation unit, such as navigation unit 200. In this example, terrain display 700 includes transverse vertical profile view 702, top view 704, and side view 706. These views are similar to those presented in FIGS. 5 and 6. In this example, however, these views are presented for an entire route of an aircraft and shows planned level flight and climbing segments for this route.

In this depicted example, a route for a flight plan is represented by segment 708 between point 710 and point 712. Segment 708 may change if the flight plan changes.

Terrain 714 is displayed with segment 708 overlaid in top view 704 to allow an operator to see terrain 717 along the planned route of the aircraft.

Side view 706 provides a side view of terrain 714 in section 716. In these examples, section 716 illustrates terrain 714 directly below segment 717. As can be seen in this example, segment 717 represents a planned route for an aircraft and includes various level and climbing segments.

Transverse vertical profile view 702 provides a front view or cross-section of the planned route in this example. This cross-section is illustrated using lines 722, 724, and 726.

In these illustrative examples, lines 728, 730, and 732 are displayed in top view 704. Lines 734, 736, and 738 are displayed in side view 706. These graphic indicators may be correlated between the different views. For example, lines 722, 724, and 728 correspond to each other. Lines 734, 736, and 738 correspond. Finally, lines 722, 738, and 732 correspond to other. Further, in these examples, symbols, such as symbols 740 and 742 may be displayed to represent the location of the aircraft with respect to the route in different views.

In this manner, terrain display 700 provides a view of an entire route loaded into a navigation unit. This route may be viewed such that a pilot may see various changes in the phases of a flight. These changes may be, for example, without limitation, climbing phases, descending phases, and/or level phases. Thus, FIGS. 5 and 6 illustrate current conditions for an aircraft, while FIG. 7 illustrates current and future conditions for an aircraft based on a flight plan.

Further, terrain display 700 in FIG. 7 also may be used in a planning phase before a flight. This type of display may be generated based on a proposed flight plan that a pilot intends to fly. In this manner, the different advantageous embodiments may be implemented for use in planning future flight plans as well displaying currently active or currently followed flight plans.

Figure 8:
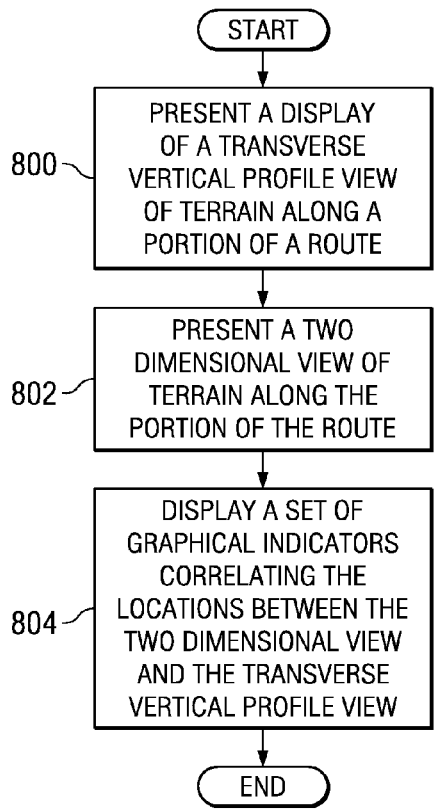
FIG. 8 is a flowchart of a process for displaying terrain information in accordance with an advantageous embodiment.

With reference now to FIG. 8, a flowchart of a process for displaying terrain information is depicted in accordance with an advantageous embodiment. The process illustrated in FIG. 8 may be implemented in a software component, such as terrain display process 206 in FIG. 2.

The process begins by presenting a display of a transverse vertical profile view of terrain along a portion of a route (operation 800). The view presented in operation 800 may be similar to transverse vertical profile view 502 in FIG. 5. This view may include a display of terrain along with contour lines, or just a set of contour lines in these examples. These contour lines also may form the graphical indicators in this view. The process presents a two dimensional view of terrain along the portion of the route (operation 802). Operation 802 may be implemented by presenting views, such as top view 504 and/or side view 506 in FIG. 5.

The process then displays a set of graphical indicators correlating the locations between the two dimensional view and the transverse vertical profile view (operation 804), with the process terminating thereafter.

In these examples, a set of graphical indicators may be a set of lines, such as the contour lines illustrated in transverse vertical profile view 502 and the lines illustrated in top view 504 and side view 506. These lines are displayed at locations with respect to the route and they correlate to each other through the use of various indicators, such as color, line type color, and other suitable graphical indication mechanisms.

Figure 9:
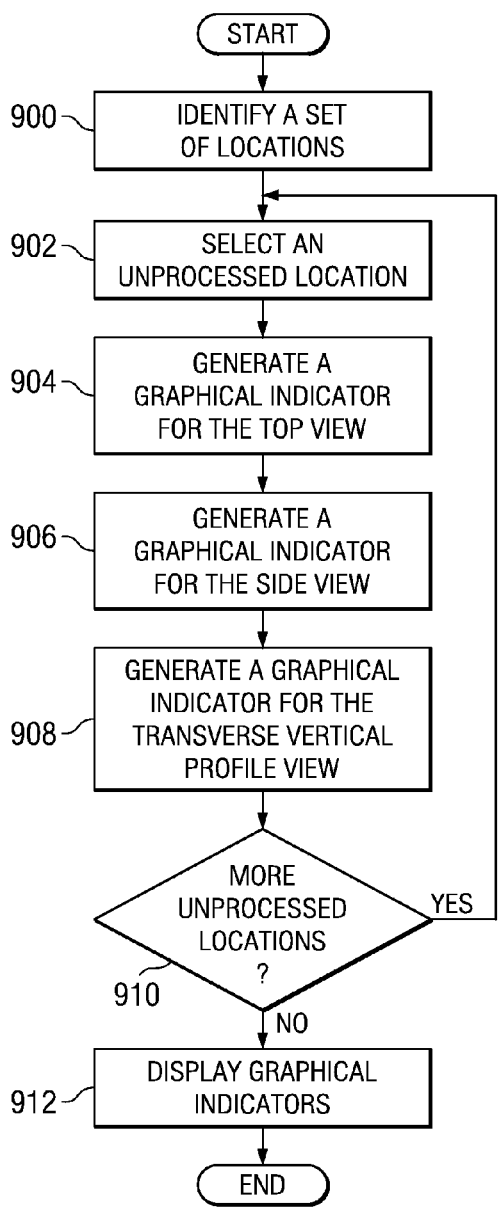
FIG. 9 is a flowchart of a process for presenting graphical indicators in accordance with an advantageous embodiment.

With reference now to FIG. 9, a flowchart of a process for presenting graphical indicators is depicted in accordance with an advantageous embodiment. The process illustrated in FIG. 9 may be implemented in a software component, such as terrain display process 206 in FIG. 2.

The process begins by identifying a set of locations for graphical indicators (operation 900). These locations may be identified in a number of different ways. For example, a preset distance may be used for each location along the route. As an example, a location may be selected for a graphical indicator every mile, every five miles, every thousand feet, or some other selected distance along the route. These locations may be selected for the entire length of the route or for some portion of the route depending on the particular implementation.

The process selects an unprocessed location (operation 902). A graphical indicator is generated for the top view at the selected location (operation 904). In these examples, the graphical indicator may be a line, such as line 528 for top view 504 in FIG. 5. In addition, this graphical indicator may include a correlating feature, such as color. The process then generates a graphical indicator for the side view (operation 906). This graphical indicator also may include the same correlating feature. For example, an example is line 534 in side view 506 in FIG. 5. The correlating feature for lines 522 and 528 may be the color blue. Thereafter, a graphical indicator is generated for the transverse vertical profile view (operation 908). This graphical indicator also includes the correlating feature. The same color allows correlation between these different locations in the different views.

The process determines whether more unprocessed locations are present (operation 910). If additional unprocessed locations are present, the process returns to operation 902 to select another unprocessed location. Otherwise, the process displays the graphical indicators on the different views (operation 912), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code to display terrain. The different advantageous embodiments present a display of transverse vertical profile view of terrain along with a portion of a route. Additionally, a two dimensional view of the terrain also is presented. A set of graphical indicators are displayed in which these graphical indicators correlate locations between the two dimensional view and the transverse vertical profile view.

In this manner, the different advantageous embodiments may provide increased situational awareness to operators of an aircraft with respect to terrain towards which an aircraft is flying. With the set of graphical indicators, multiple slices or locations for a transverse vertical profile view may be presented.

Further, an operator may be able to have increased situational awareness of changes in the terrain that an aircraft is approaching. In this manner, different features in a terrain may be identified by an operator prior to those features being reached by the aircraft. As a result, features underneath, to the left, and to the right of an aircraft may be identified. These features may be ones that have been reached by the aircraft or being approached by the aircraft.

Further, although the different advantageous embodiments have been described with respect to an aircraft, the different advantageous embodiments may be applied to other types of vehicles. For example, these types of displays may be employed by vehicles such as, for example, ships, submarines, spacecraft, and other suitable vehicles.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for presenting, on a display, terrain along a route of an aircraft, the computer implemented method comprising:
   providing, using a location information unit, location information of the aircraft;
   storing instructions, on a memory communicating with a processor, and the processor executing the instructions for:
      simultaneously presenting on the aircraft display, a two-dimensional display of: a top view, a side view, and a transverse vertical profile view of terrain data along a selected portion of the route, the route corresponding to a flight plan loaded in a navigation unit, wherein the transverse vertical profile view comprises a cross-section display of a vertical slice of the terrain data, wherein the display presents the vertical slice as a front view, transverse to the route from the aircraft at the selected portion along the route; and
      overlaying a plurality of graphical indicators of distance along the route such that a graphical indicator in the plurality of graphical indicators in the top view corresponds to a same distance to a second graphical indicator in the side view and a third graphical indicator in the transverse vertical profile view.

2. The computer implemented method of claim 1, wherein the graphical indicators in the plurality of graphical indicators displayed in the transverse vertical profile view are terrain contour lines.

3. The computer implemented method of claim 1 further comprising:
   color coding the plurality of graphical indicators such that the graphical indicator in the plurality of graphical indicators in the top view corresponds to the same distance to the second graphical indicator in the side view and the third graphical indicator in the transverse vertical profile view have a same color.

4. The computer implemented method of claim 1 further comprising:
displaying a symbol for the aircraft in a position along the route in each of the top view and the side view of terrain data.

5. The computer implemented method of claim 1 further comprising:
displaying a symbol for the aircraft in the transverse vertical profile view.

6. A computer implemented method for presenting terrain data, the computer implemented method comprising:
receiving in a processor, from a location information unit, location information of an aircraft;
storing instructions, on a memory communicating with the processor, and the processor executing the instructions for:
presenting a display of a top view, a side view, and a transverse vertical profile view of terrain along a selected portion of a route of a vehicle, wherein the transverse vertical profile view comprises a cross-section display of a vertical slice of the terrain, wherein the display presents the vertical slice as a front view, transverse to the route from the vehicle at the selected portion along the route;
presenting a two-dimensional view of the terrain along the route; and
displaying a set of graphical indicators correlating locations between the two dimensional view and the transverse vertical profile view, such that a first indicator in the graphical indicators in the top view corresponds to a same distance to a second indicator in the side view and a third indicator in the transverse vertical profile view.

7. The computer implemented method of claim 6, wherein the display of the transverse vertical profile view of the terrain along the portion of the route comprises a plurality of terrain contour lines representing the terrain.

8. The computer implemented method of claim 6, wherein the step of presenting the two dimensional view of the terrain along the route comprises:
presenting at least one of a top view of the route and a side view of the route.

9. The computer implemented method of claim 6, wherein the set of graphical indicators comprises at least one of color and graphical icons.

10. The computer implemented method of claim 6, further comprising:
wherein the two-dimensional view comprises a top view and a side view; and
color coding the set of graphical indicators such that a graphical indicator in the set of graphical indicators in the top view corresponds to a same distance to the graphical indicator in the side view and the transverse vertical profile view that have a same color.

11. The computer implemented method of claim 6 further comprising:
displaying a symbol for an aircraft in a position along the portion of the route in the two dimensional view and the transverse vertical profile view of the terrain data.

12. The computer implemented method of claim 6, wherein the vehicle is one of an aircraft, a ship, a truck, a spacecraft, and a submariner.

13. An apparatus comprising:
a location information unit that provides location information of a vehicle;
a processor unit connected to the location information unit, such that the processor unit communicates with instructions stored in a memory to identify a location of the vehicle from the location information and generate an overlay of a plurality of indicators for: a top view, a side view, and a transverse vertical profile view of terrain data along a selected portion of a route, the route corresponding to a planned route loaded in a navigation unit, such that the transverse vertical profile view comprises a cross-section display of a vertical slice of the terrain data, wherein the overlay presents the vertical slice, as a front view, transverse to the route from the vehicle at the selected portion along the route, such that a first indicator in the plurality of indicators in the top view corresponds to a same distance to a second indicator in the side view and a third indicator in the transverse vertical profile view; and
a display connected to the processor unit, the display presenting in two dimensions: the top view, the side view, and the transverse vertical profile view of the terrain data at the selected portion along the route with the overlay.

14. The apparatus of claim 13, wherein the processor unit is the navigation unit for an aircraft.

15. The apparatus of claim 13, further comprising the processor unit configured to code the plurality of indicators such that the first indicator in the plurality of indicators in the top view corresponds to the same distance to the second indicator in the side view and to the third indicator in the transverse vertical profile view comprising a same color.

16. A computer program product configured to present, on a display, terrain along a route of an aircraft, the computer program product comprising:
input from a location information unit that provides location information of the aircraft;
a non-transitory computer readable medium;
program code, stored on the non-transitory computer readable medium, communicating with a processor and simultaneously presenting a display in two dimensions of: a top view, a side view, and a transverse vertical profile view of terrain data, along a selected portion of the route on the aircraft display, the route corresponding to a flight plan loaded in a navigation unit, wherein the transverse vertical profile view comprises a cross-section display of a vertical slice of the terrain data, wherein the display presents the vertical slice as a front view, transverse to the route, from the aircraft at the selected portion along the route; and
program code, stored on the non-transitory computer readable medium, configured to overlay a plurality of graphical indicators of distance, from the aircraft, along the route such that a first graphical indicator in the plurality of graphical indicators in the top view corresponds to a same distance to a second graphical indicator in the side view and a third graphical indicator in the transverse vertical profile view.

17. The computer program product of claim 16, wherein the third graphical indicator in the plurality of graphical indicators displayed in the transverse vertical profile view are terrain contour lines.

18. The computer program product of claim 16 further comprising:
program code, stored on the non-transitory computer readable medium, for color coding the plurality of graphical indicators such that the first indicator in the plurality of graphical indicators in the top view corresponds to the same distance to the second graphical indicator in the side view and the third graphical indicator in the transverse vertical profile view have a same color.

19. The computer program product of claim 16 further comprising:

program code, stored on the non-transitory computer readable medium, for displaying a symbol for the aircraft in a position along the route in each of the top view and the side view of terrain data.

20. The computer program product of claim 16 further comprising:

program code, stored on the non-transitory computer readable medium, for displaying a symbol for the aircraft in the transverse vertical profile view.

21. The method of claim 6, further comprising displaying the set of graphical indicators correlating locations between the two dimensional view and the transverse vertical profile view occurring simultaneously, the transverse vertical profile comprising a respective contour line of terrain for each of three different distances, along the route, in front of the vehicle, each contour line being a cross-sectional vertical slice of the terrain transverse to the route at the respective distance.

22. The computer program product of claim 16, further comprising the program code configured to simultaneously display the graphical indicators in the top view, the side view, and the transverse vertical profile view, the transverse vertical profile comprising a respective contour line of terrain for each of three different distances, along the route, in front of the aircraft, each contour line being a cross-sectional vertical slice of the terrain transverse to the route at the respective distance.

\* \* \* \* \*